April 21, 1936.  A. P. FERGUESON  2,038,425

TIRE COVER

Filed Dec. 14, 1931

Inventor:
Arthur P. Fergueson.
by Charles H. Hills Attys.

Patented Apr. 21, 1936

2,038,425

UNITED STATES PATENT OFFICE 2,038,425

TIRE COVER

Arthur P. Fergueson, Detroit, Mich., assignor to Lyon Cover Company, Detroit, Mich., a corporation of Michigan Application December 14, 1931, Serial No. 580,763

9 Claims. (Cl. 150—54)

This invention relates to tire covers in general and to tire covers for disposition about the spare tires in automobile fenderwells in particular.

It is one of the objects of this invention to provide a substantially rigid unitary tire cover embodying portions for covering the exposed side wall and tread portions of a spare tire carried in a fenderwell or the like.

Another object of this invention is to provide a shove-down tire cover for spare tires carried in fenderwells and the like, capable of securement to tires of various sizes and conditions of wear.

A further object of the invention resides in the provision of improved means by which a tire cover may be detachably secured in tire protecting position on a spare tire in a fenderwell or the like.

In accordance with the general features of the invention, a tire cover is formed of a side plate of such construction as to conceal the outer side wall of a tire when the same is disposed in a fenderwell or the like, and a rim portion extending preferably more than 180° about the tread portion of the tire to conceal the otherwise exposed portion of the tire tread when the tire is in the well, said portions being made of individual sections which are permanently secured together by a lock seam or in any other suitable way. Means associated with the rim portion serve to space the latter from direct contact with the tread, and also to insure the cover's being securely held in position when used in connection with tires having different tread sizes.

It is a still further object of the invention to employ an improved method by which a tire cover of the character mentioned is constructed. This method, in one embodiment thereof, comprises the operations of stamping out a side plate, rolling the rim portion, and permanently securing the outer marginal edge portion of the plate to a marginal portion of the rim by a lock seam or otherwise.

Further objects and advantages of the invention will become apparent as the description proceeds.

This invention (in a preferred form) is illustrated in the drawing and hereinafter more fully described.

Figure 1:
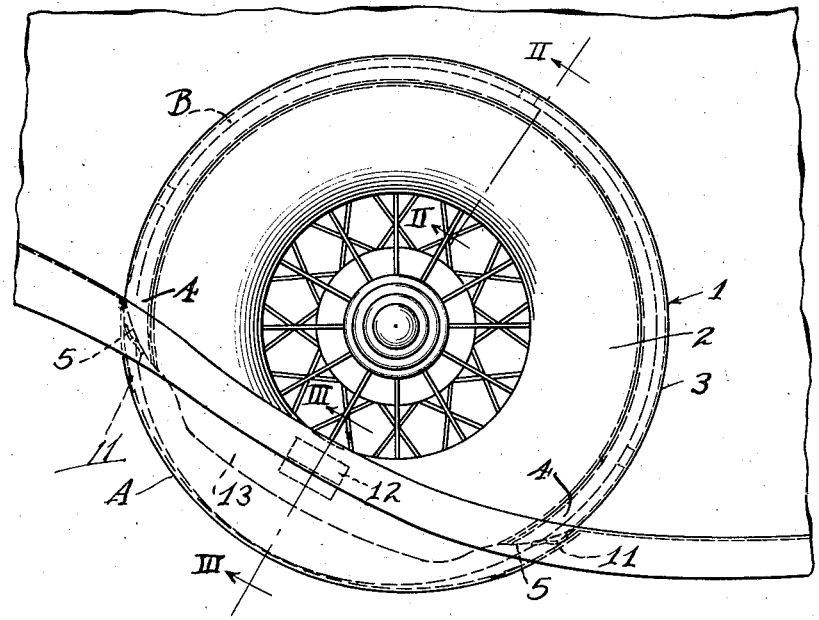
Figure 1 is a fragmentary elevational view of a tire in a fenderwell with a cover embodying the present invention disposed upon the tire.

Referring now more particularly to the drawing, wherein the same parts are designated throughout by the same reference characters, there is shown at A a fender of a motor vehicle or the like in which a spare tire B is supported. The outer side wall and peripheral portions of the tire B projecting from the well A are shown as concealed by a tire cover 1 forming the subject matter of the present invention. This tire cover comprises a side plate 2 of preferably arcuate cross section and a rim portion 3 which is also preferably of substantially arcuate cross section. The portions 2 and 3 are preferably so fashioned that when they are in position on a tire in the fenderwell A, said portions preferably project into the well A, thus giving the cover the appearance when in use of being continuous. The side plate 2 may be formed by any process such as by blanking out of sheet metal, and the rim portion 3 is preferably formed from strip metal by a rolling operation. A longitudinal margin of the rim portion is then placed in juxtaposition to the outer peripheral margin of the side portion, and these portions are permanently secured together by a lock seam in accordance with the illustrated modification of the invention, although it will be understood that said margins could be interlocked by welding or any other suitable process. The parts then constitute substantially an integral one-piece tire cover.

Figure 2:
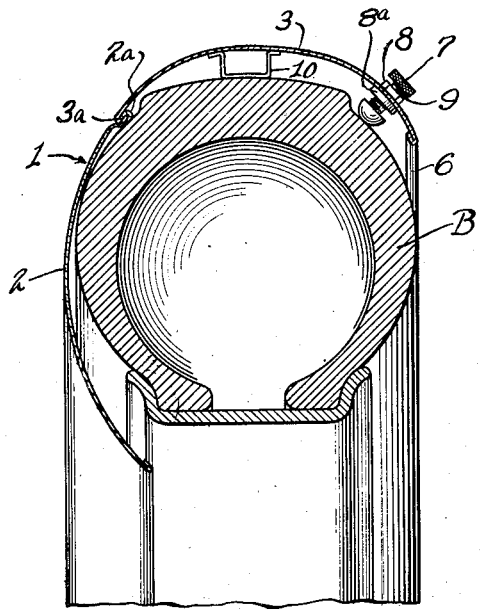
Figure 2 is an enlarged fragmentary sectional view taken approximately in the plane indicated by the line II—II in Figure 1.
Figure 3:
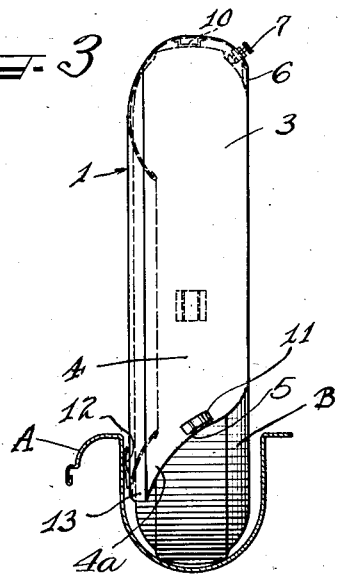
Figure 3 is a sectional view of the fenderwell, taken approximately in the plane indicated by the line III—III in Figure 1, the tire and cover disposed thereon and in the well being shown in elevation.

The material of which the tire cover forming the subject matter of the present invention is constructed is preferably sufficiently stiff to afford rigidity to the cover, yet preferably possesses a somewhat resilient property. This property of the material of the tire cover permits the latter to be flexed sufficiently to allow the cover to be shoved in a direction substantially parallel to the plane of the tire, into covering relation to the tire. That is, the rim portion 3 has a circumferential extent in excess of 180°, and it is accordingly necessary for the ends 4 thereof to be forced radially outwardly by the tread of the tire. The edges 5 of the ends 4 are inclined from the side plate 2 to the free longitudinal edge 6 so that when the tire and cover are placed in a fenderwell A, the entry of the ends 4 into the well will be facilitated, inasmuch as the narrow portion 4a, being closer to the tire than the remainder of the end 4, will easily engage within the well, the latter camming the remainder of the inclined edge portion 5 toward the tread of the tire. Thus once the tire and cover are located in the well as shown in Figures 1 and 2, the end portions 4 of the cover rim 3 will resiliently engage the corresponding walls of the well A, thereby inhibiting rattling between the cover and the well. It will be observed that the rim member has the shape in development of a substantially isosceles trapezoid.

Tires adapted for use in connection with a given size wheel vary within a certain range in their outside diameter and width of tread. This variance is also manifest in connection with tires which are inflated different amounts or are worn at the tread. The tire cover constructed in accordance with the present invention is provided with means by which the cover will adapt itself equally to such different sizes of tires. To this end, an adjustable button 7 is secured to the tread covering part or rim 3 adjacent its free longitudinal edge, so as to engage the tread or wall of the tire B at a point substantially directly opposite the lock seam 2a, 3a. The button comprises a threaded shank 9 passing through an opening in the rim part 3 and through a pair of nuts 8 and 8a disposed on opposite sides of said opening and in threaded engagement with the shank of the button, the inner nut 8a being secured to the rim part 3. The button may therefore be easily adjusted to impinge upon the tire with sufficient pressure to insure proper positioning of the cover on the tire. This will act furthermore as an additional anti-rattling means.

It may be desirable to space the rim part 3 from the tread of the tire, and to this end spacers 10 of generally U-shaped form spot welded or otherwise secured to the rim part 3 are employed. While serving to properly space the rim part 3 from the tread of the tire, the spacers 10 are however preferably of such size and are so arranged that the normal straight line distance between the ends 4 of the rim part 3 is preferably less than the diameter of the tire at its tread to thereby yieldably resist withdrawal of the cover from the tire when properly positioned thereon as shown in the drawing.

In order to further insure against rattling, spring elements 11 are secured to the ends 4 of the rim part 3 and are so located that they are disposed within and engage against the wall of the well A when the cover is in proper position. To prevent rattling due to lateral movement of the tire in the well A, an additional spring element 12 is applied to that portion 13 of the side plate 2 which is disposed in the well when the tire and cover are in proper position.

It will be seen from the foregoing that the tire cover constructed in accordance with the present invention is produced by a simplified process embodying a low cost, is adapted for cooperation with tires having different tread sizes and diameters, and is of such construction as to inhibit rattling when disposed on a spare tire in a fenderwell or the like and facilitate the positioning of the cover in the well.

A plurality of buttons 7 could be used and located as desired, and the tire is engaged substantially only by the lock seam, the spacers 10 and the button or buttons 7. The button or buttons 7 could be replaced by spring means for the same purpose.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. An open bottom shove-down tire cover for use in connection with a spare tire carried in a fenderwell, said cover comprising a substantially form-retaining structure embodying a substantially rigid side plate member for concealing that portion of one side wall of a tire which projects above the well, and a rim member for concealing that portion of the tread which projects above the well, means affording a permanent connection between said members and engageable with one side of the tire adjacent the tread thereof, and means associated with the rim member and engageable with the opposite side of the tire for securely clamping the cover on the tire, said connection and second means serving to space the remainder of the cover from the tire.

2. A shove-down cover open at its bottom so as to be shoved down onto a spare tire carried in a fenderwell, said cover comprising a substantially form-retaining structure embodying a substantially rigid side plate member for concealing that portion of one side wall of a tire which projects above the well, and a rim member for concealing that portion of the tread which projects above the well, means affording a permanent connection between said members, said members terminating adjacent the mouth of the well when in proper tire protecting position, means associated with the second member and engageable with the opposite side of the tire for securely clamping the cover on the tire, and means for spacing the second member from the tread of the tire.

3. A cover for a spare tire carried in a fenderwell, said cover comprising a substantially rigid structure embodying a side plate member for concealing that portion of one side of a tire which projects above the well, and a rim member for concealing that portion of the tread which projects above the well, said rim member being of generally isosceles trapezoidal form in development, with its base secured to the side plate member and its head free and extending more than 180°, the base portions of the end edges of the rim member being closer together than the ends of the mouth of the well so as to fit thereinto, other portions of said end edges being normally farther apart than the ends of the mouth of the well, said end edges being resilient so that as the base portions thereof are positioned in the well, the latter cams said edges into the well, causing said edges to resiliently engage the well and prevent rattling between the cover and the well.

4. A cover for a spare tire carried in a fenderwell, said cover comprising a substantially rigid structure embodying a side plate member for concealing that portion of one side of a tire which projects above the well, and a rim member for concealing that portion of the tread which projects above the well, said rim member being of longitudinally arcuate form in excess of 180° and having one of its longitudinal margins connected substantially throughout its length to the side plate member, the opposite margin of said rim being free, an end of the connected margin of said rim being arranged to fit in the well, the edge at said end being inclined from the connected margin in the direction of the other end, viewed along the rim member, the rim at said edge being inclined away from the cover axis and being resilient so that said edge is cammed by the mouth of the well toward the tire as the tire and cover are deposited in the well, said edge thereby resiliently engaging the well and preventing rattling between the cover and the well.

5. A shove-down cover open at its bottom for application to a spare tire while the tire is carried in a fenderwell, said cover comprising a substantially form-retaining structure embodying a substantially rigid side plate member for concealing that portion of one side of the tire which projects above the well and a rim member for concealing that portion of the tread which projects above the well, means affording a permanent connection between said members, and means carried by said rim member and arranged to project between the rim member and the tire and engageable with the opposite side of the tire so as to cooperate with the plate member to securely clamp the cover on the tire.

6. A cover for application to a spare tire carried in a fenderwell, said cover comprising a unitary substantially form-retaining structure embodying a side plate member and a transversely resilient rim member for covering a side and tread portion of the tire, means affording a permanent connection between said members, adjustable means associated with said rim member and engageable with the opposite side of the tire for securely holding the cover on tires of different sizes, the connected edge of said rim member being longer than the opposite edge of said rim member and arranged closer to the tire than said opposite edge when the cover is in proper tire protecting position, said edges being connected by inclined edges which, upon entry into the fenderwell, will be cammed by the wall of the fenderwell inward toward the tire until the tire rests in the bottom of the fenderwell, whereby the ends of the rim member will resiliently engage the end walls of the fenderwell and serve to inhibit rattling between the cover and the fenderwell.

7. An open bottom tire cover for application to a spare tire while the tire is carried in a fenderwell, said cover comprising a substantially form-retaining structure formed to terminate in the well adjacent the mouth thereof when mounted over the tire, and embodying a substantially rigid side plate member for concealing that portion of one side of the tire which projects above the well, and a rim member for concealing that portion of the tread which projects above the well, means affording a permanent connection between said members, means associated with the rim member and engageable with the opposite side of the tire for securely clamping the cover on the tire, portions of said members being disposable in the well, and yieldable means engageable between said portions and the well for preventing rattling of the cover therein.

8. An open bottom tire cover for application to a spare tire while the tire is carried in a fenderwell, said cover comprising a substantially form-retaining structure formed to terminate in the well adjacent the mouth thereof when mounted over the tire, and embodying a substantially rigid side plate member for concealing that portion of one side of the tire which projects above the well, and a rim member for concealing that portion of the tread which projects above the well, means affording a permanent connection between said members, means associated with the rim member and engageable with the opposite side of the tire for securely clamping the cover on the tire, means for spacing the rim member from the tread of the tire, portions of said members being disposable in the well, and yieldable means engageable between said portions and the well for preventing rattling of the cover therein.

9. In combination with a fenderwell for carrying a spare tire, a shove-down substantially form-retaining unitary tire cover open at its bottom so as to be applied to the tire while the tire is in the well, and including a substantially rigid part for covering an exposed side wall of the tire and a transversely flexible tread covering part having free end portions spaced from the tire when the cover is in proper tire protecting position thereon, said end portions being flexed toward the tire by the well when the tire rests in the well, to insure a snug fit of the cover therein.

ARTHUR P. FERGUESON.